June 18, 1946.  F. BISZANTZ  2,402,362
DUMP BODY
Filed May 6, 1944   2 Sheets-Sheet 2
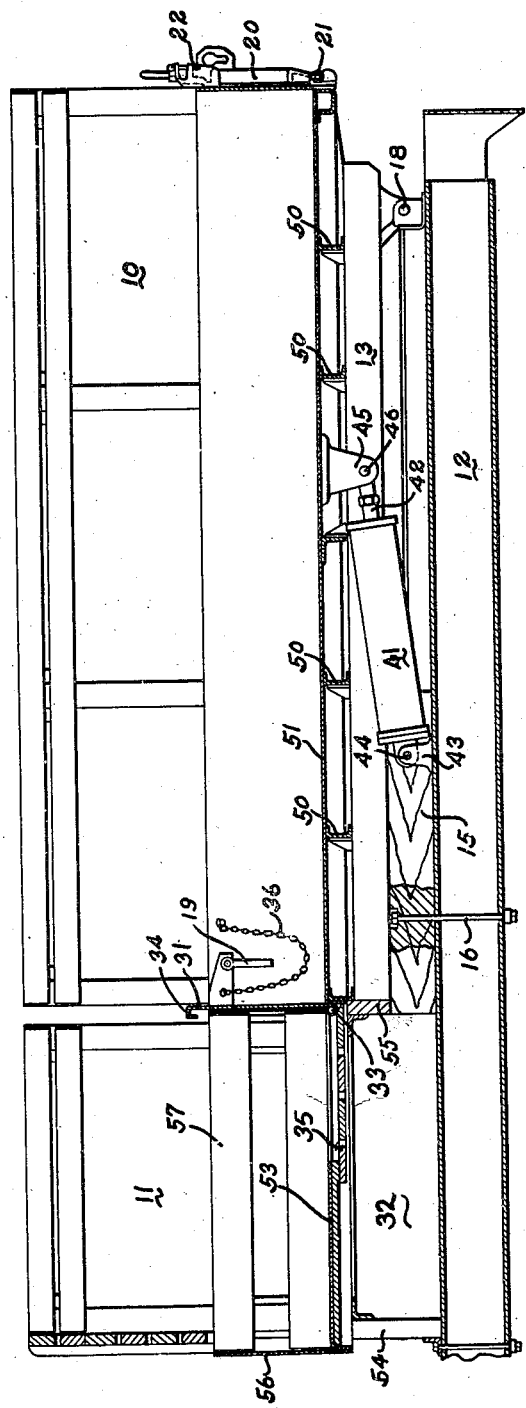
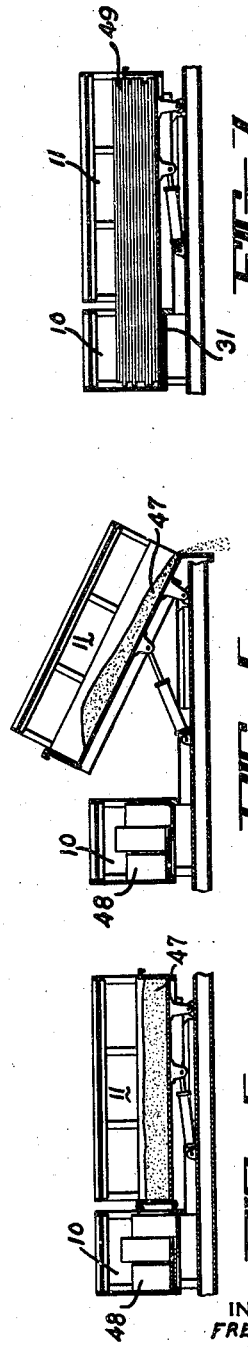
INVENTOR
FRED BISZANTZ
BY
Toulmin & Toulmin
ATTORNEYS Patented June 18, 1946

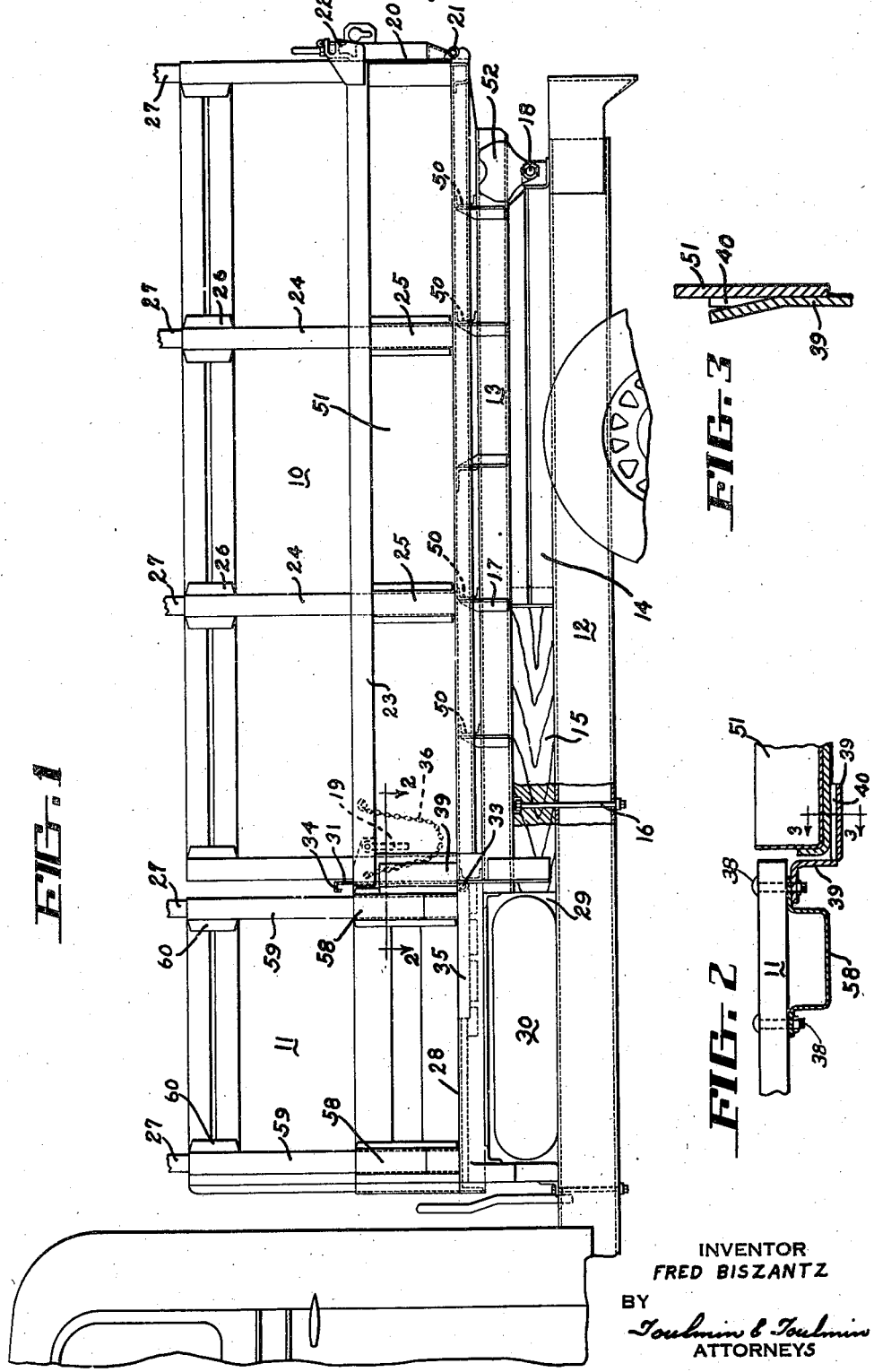

2,402,362

UNITED STATES PATENT OFFICE 2,402,362

DUMP BODY

Fred Biszantz, Galion, Ohio, assignor to The Galion Metallic Vault Company, Galion, Ohio, a corporation of Ohio Application May 6, 1944, Serial No. 534,457

7 Claims. (Cl. 298—17)

This invention relates to dump cargo bodies for trucks, and particularly to a combination dump cargo body that is adapted for use upon long wheelbase trucks.

When using dump bodies on long wheelbase trucks, one of the greatest dangers in their use is that the dump body, being of the same length as the long wheelbase truck, can be overloaded with heavy materials such as sand and gravel, thereby straining the frame of the truck and overloading the hoist when attempting to dump the load. In prior arrangements, the long dump body has been provided with a partition which separated the body into two sections. It was intended that only the rear section of the dump body should be loaded with heavy materials, such as sand and gravel. However, the actual use of the trucks in this manner could not be controlled because the workmen would regularly load the entire truck body with the heavy materials, thus overloading the same.

Also, the prior long dump bodies, used on long wheelbase trucks, have required a relatively large overhead clearance to permit the truck body to be dumped. Also, the long dump body throws the center of gravity of the truck when the body of the truck is in dumping position too high for good stability of the truck.

One object of the invention is to provide a dump cargo body for long wheelbase trucks in which overloading the truck is avoided.

Another object of the invention is a dump cargo body for long wheelbase trucks which, during dumping, has its center of gravity in a relatively low position and which consequently is sufficiently stable so that top swaying, tipping, etc., do not occur.

Another object of the invention is a dump cargo body for long wheelbase trucks which, when loaded, can, at the same time, carry other merchandise not to be dumped and from which this other merchandise does not have to be removed during dumping.

Another object of the invention is a dump cargo body for long wheelbase trucks which also can be used for carrying lumber positioned over its entire length.

Another object of the invention is a dump cargo body for long wheelbase trucks in which, when filled and in horizontal position, the center of gravity is located close to or above the axis of the rear wheels.

Another object of the invention is to provide a combination dump cargo body wherein the body consists of two parts, one of which is a movable dump body part adapted to receive heavy loads such as sand and gravel, and the other part of the body is a stationary stake type body, whereby the truck frame cannot be overloaded with heavy material such as sand and gravel because they will not be retained satisfactorily in the stake type part of the combination dump cargo body.

Still another object of the invention is to provide a combination dump cargo body, a part of which consists of a dump body and another part of which consists of a stake type body, wherein a partition is provided between the two parts of the body that can be lowered to permit the use of the entire floor of both parts of the body simultaneously for carrying long articles, such as lumber, and the dump portion of the body can be operated in nominal manner to quickly unload the lumber from the body if desired.

Still another object of the invention is a dump carbo body for long wheelbase trucks which, for dumping, requires a relatively low overhead clearance so that it can be used for work under bridges, in tunnels, or other inside structure.

Still another object of the invention is a dump cargo body for long wheelbase trucks in the front part of which seats can be provided which seats can be occupied during dumping.

Still another object of the invention is a dump cargo body for long wheelbase trucks which is transferable to short wheelbase chassis.

The objects of the present invention are accomplished by making the front part of the dump cargo body for long wheelbase trucks stationary and separable from the tiltable rear part.

The invention will be more fully understood from the following description taken in connection with the accompanying drawings, in which Figure 1 is a side elevational view of a dump cargo body of the invention in which parts have been broken away in order to show certain parts of the device.

Figure 2 is a cross sectional view taken along the line 2—2 of Figure 1.

Figure 3 is a cross sectional view taken along line 3—3 of Figure 2.

Figure 4 is a sectional view taken along the longitudinal axis of the truck body.

Figure 5 is a diagrammatic sectional view of the truck showing it in loaded condition.

Figure 6 is a diagrammatic sectional view showing the truck body of Figure 5 during dumping.

Figure 7 is a diagrammatic sectional view showing the truck when being used for lumber.

The dump cargo body of this invention, as illustrated in the drawings, consists of one section or part 10 that constitutes the dump body portion of the dump cargo body, and a stationary section or part 11 that constitutes the stake type portion of the body that is adapted to receive general cargo. The truck body, consists of the parts 10 and 11 and is carried by the truck frame 12 consisting of the usual metal channel irons.

The dump cargo body consists of longitudinally extending channel members 13 that support transverse channel members 50, which in turn support the dump body 51. A sill 14 is disposed between the channel member 13 and the frame 12 whereby to support the dump body 51 upon the chassis frame 12. The front part of the sill 14 may consist of a wood sill section 15. The longitudinal channels 13 for the dump body 51 are secured to the transverse channels 50 by means of the bracket members 17.

The dump body 51 is provided with a bracket 52 provided on each longitudinal channel 13 that has a pivot pin 18 extending therethrough into engagement with the sill frame 14 and about which the dump body part 10 pivots during a dumping operation. The dump body 51 is provided with the usual rear door 20 that is hinged upon suitable hinge pins 21 and is provided with a locking or latching mechanism 22 to retain the rear door 20 in locked position to close the end of the dump body.

The side walls of the dump body 51 are provided with metal sockets 25 that are attached to receive stakes 24 to increase the heighth of the dump body 51, when cargo other than sand and gravel is to be carried in the dump body 51. The stakes 24 may also be provided with sockets 26 that receive bar members 27 to support a tarpaulin if it is desired to cover the body 51.

The stationary stake type part 11 of the truck body is stationarily mounted upon the chassis frame 12. This front part 11 consists of a floor section 53 that is supported upon the chassis frame 12 by means of a sill 54 at the front end thereof, and a sill 55 at the rear end thereof. The sill 55 is supported upon the sill 15 of the truck chassis.

The stake type part 11 of the truck body has a metal front wall 56 and horizontal wood sill members 57 forming the side walls thereof.

The side walls of the part 11 are provided with the sockets 58 that may receive stakes 59 to increase the heighth of the cargo carrying section. These stakes 59 also have sockets 60 that may carry stakes 27 for supporting a tarpaulin over this part of the body.

The dump body 51, or the rear part of the combination dump cargo body, is provided at its front end with a partition 31 that is hinged at its lower end by means of the hinge pin 33. The partition 31 is arranged to rotate in a counterclockwise direction, as viewed in Figure 4, whereby the partition can be lowered to rest in the recess 35 provided in the floor 53 of the stake section 11 of the truck body, thereby making the floor of both parts 10 and 11 substantially continuous. A chain 36 is connected to the partition 31 to support the same when the dump body part 10 is raised to dump material that may be carried in the body when the partition 31 has been lowered to the position heretofore mentioned. A suitable locking mechanism 19 is provided for locking the partition 31 in position as shown in Figure 4.

In Figures 2 and 3 there is illustrated means for aligning the front part 11 of the truck body with the rear part 10, so as to prevent any side sway movement of the part 10 relative to the part 11. This means consists of a Z shaped plate 39 that is secured to the side wall of the front part 11 by means of bolts 38, one of these plates 39 being positioned on each side of the truck body 51. The dump body 51 has a guide bar 40 fixedly attached to each of the side walls thereof that engages the guide plate 39 when the rear dump section 10 is in position as shown in Figure 1 to thereby wedge the rear section 10 between the guide plates 39 carried upon the side walls of the front section 11.

Dumping of the rear part 10 of the truck body is effected by means of the hydraulic motor 41, shown in Figure 4. This motor has a plunger 42. One end of the hydraulic motor is carried by the lower channel member 12 of the chassis by means of a supporting member 43 to which it is connected by a pivot 44. The other end of the hydraulic motor is fastened to the bottom of the dump body which carries the supporting member 45 to which the end of the plunger 42 is attached by means of the pivot 46. It can be readily seen that movement of the plunger 42 out of the cylinder of the hydraulic motor 41 lifts the dump body as shown in Figure 6.

Since all the parts necessary for effecting tilting of the dump body 51 are not required for the stationary stake type part 11, some extra space 32 is left under it which may be used for holding miscellaneous service parts, such as a spare tire 30.

Figures 5 and 6 demonstrate one example as to how the dump body of the invention may be used advantageously. In Figure 5 the dump body 11 is filled with heavy weight material 47, for instance gravel, and the stationary front compartment with packages, crates or similar goods 48 not to be dumped. Figure 6 illustrates dumping of the material contained in compartment 11 while the front part 10 remains in horizontal position.

Figure 7 shows that merely by lowering the partition door 31 the truck body may be used over its entire length for carrying long lumber, designated 49. This lumber can also be dumped by tilting the rear body 11 of the truck. In this case the front end of the load is supported during tilting by the lowered partition door 31 held in position by the chain 36.

As material for the dump body, steel is preferred. However, since the stationary front part 11 is not required to carry heavy loads it may also be made of wood instead of steel. Substitution of wood for steel in the stationary compartment reduces the weight of the entire truck and also makes the building of the truck less expensive. Since only the rear part of the body is lifted during dumping the truck of this invention and thus the center of gravity is not moved as highly as if the entire truck body were lifted, the truck built according to the invention has a considerably greater stability during dumping than long wheelbase trucks previously used having dump bodies thereon. Besides, the trucks described require less overhead clearance so that they can be used more often for work under bridges, in tunnels or other inside structure. Another advantage of the new dump body is that during shipping the stake compartment could be detached and nested in the rear dump body. The rear part of the dump body also could be transferred onto a short wheelbase chassis if desired.

Instead of using the stationary front part for merchandise not to be dumped, seats can also be arranged in it for the workmen. In this case the construction would entail the advantage that the truck could be dumped while the workmen remain on their seats.

It will be understood that while there have been described certain specific embodiments of my invention, it is not intended thereby to have this invention limited to or circumscribed by the specific details of materials, arrangement of parts and conditions set forth in the specification or illustrated in the drawings in view of the fact that this invention may be modified according to individual preference and conditions without departing from the spirit of this disclosure and the scope of the appended claims.

Having thus fully described my invention what I claim as new and desire to secure by Letters Patent is:

1. A dump cargo body for trucks comprising, a stationary stake type section forming the front part of the body and a tiltable dump section forming the rear part of the body, means to prevent transverse movement of one part of the body relative to the other, and a tiltable partition wall between said front part and said rear part movable into position to form a part of the floor section of said front part to thereby permit use of both parts simultaneously as a single truck body unit.

2. A dump cargo body for trucks comprising, a stationary stake type front part, a tiltable dump body rear part, a partition between said front part and said rear part, means for hinging said partition upon the front end of said rear part whereby to permit the same to be lowered into substantially planar relationship with the floor of said stationary and tiltable parts.

3. A dump cargo body for trucks comprising, a stationary stake type front part, a tiltable dump body rear part, a partition between said front part and said rear part, means for hinging said partition upon the front end of said rear part whereby to permit the same to be lowered into substantially planar relationship with the floor of said stationary and tiltable parts, and a recess in the floor of said stationary part to receive said partition.

4. A dump cargo body for trucks comprising, a stationary stake type front part, a tiltable dump body rear part, a partition between said front part and said rear part, means for hinging said partition upon the front end of said rear part whereby to permit the same to be lowered into substantially planar relationship with the floor of said stationary and tiltable parts, and means for holding said partition in said position when said rear part is tilted.

5. A dump cargo body for trucks comprising, a stationary section forming the front part of the body and a tiltable dump section forming the rear part of the body, means to prevent transverse movement of one part of the body relative to the other, and a tiltable partition wall between said front part and said rear part movable into position to form a part of the floor section of said front part to thereby permit use of both parts simultaneously as a single truck body unit.

6. A dump cargo body for trucks comprising, a stationary section forming the front part of the body and a tiltable dump section forming the rear part of the body, and a tiltable partition wall between said front part and said rear part movable into position to form a part of the floor section of said front part to thereby permit use of both parts simultaneously as a single truck body unit.

7. A dump cargo body for trucks comprising, a stationary section forming the front part of the body and a tiltable dump section forming the rear part of the body, a tiltable partition wall between said front part and said rear part movable into position to form a part of the floor section of said front part to thereby permit use of both parts simultaneously as a single truck body unit, and means for holding said partition in said position when said rear part is tilted.

FRED BISZANTZ.